UNITED STATES PATENT OFFICE.

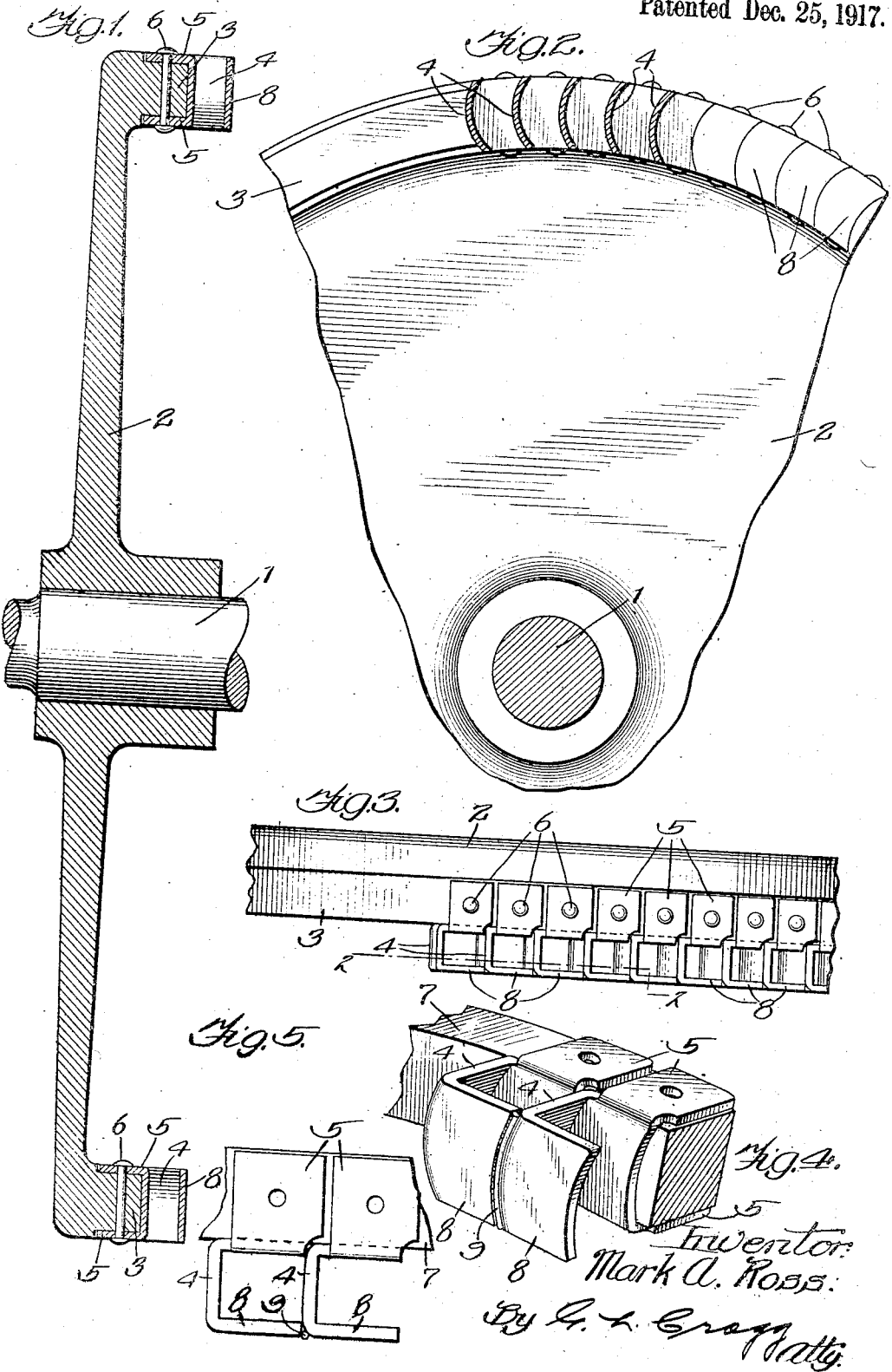

MARK A. ROSS, OF CHICAGO, ILLINOIS.

TURBINE.

1,251,109.     Specification of Letters Patent.     Patented Dec. 25, 1917.

Application filed June 16, 1916. Serial No. 103,958.

*To all whom it may concern:*

Be it known that I, MARK A. ROSS, citizen of the United States, residing at Chicago, in the county of Cook and State of Illinois, have invented a certain new and useful Improvement in Turbines, of which the following is a full, clear, concise, and exact description, reference being had to the accompanying drawings, forming a part of this specification.

My invention relates to turbines and has for its object an improved construction of the rotors thereof and resides in assembling the buckets of the rotor independently of the mounting for the buckets, these assembled buckets being applied as a group to the rotor wheel. Preferably all the buckets of the rotor are assembled into a single group but the invention is not to be thus limited.

In practising my invention I provide a wheel with a circular ring projecting longitudinally of the wheel from the main body portion of the wheel to lie in a plane parallel with the general plane in which the said body portion of the wheel lies. The buckets or a portion of them are provided with rearwardly extending ears that are applied to said ring preferably by means of rivets. Those outermost walls of the buckets that are substantially parallel with the plane of the wheel are welded together into a complete ring of such diameter that the rearwardly projecting ears of the buckets may embrace the aforesaid ring upon the wheel body.

I will explain my invention more fully by reference to the accompanying drawing showing the preferred embodiment thereof and in which Figure 1 is a view in sectional elevation of a wheel constructed in accordance with the invention, parts appearing to the rear of the plane on which the sectional view is taken being omitted for the sake of clearness; Fig. 2 is a view on line 2 2 of Fig. 3; Fig. 3 is a plan view of a part of the structure shown in Figs. 1 and 2; Fig. 4 illustrates two adjacent buckets in position upon an assembling ring; and Fig. 5 is a plan view of the parts illustrated in Fig. 4.

Like parts are indicated by similar characters of reference throughout the different figures.

The turbine shaft 1 has fixedly secured thereto the wheel 2 of the turbine rotor. This wheel 2 carries a ring 3 projecting from one face thereof to lie in a plane substantially parallel with the general plane of the wheel. The turbine buckets 4 or some of them are provided with rearwardly extending ears 5 that embrace the ring 3 and through which ears and ring rivets 6 are passed to assemble the buckets and wheel. When it is desired to remove the buckets from the wheel the rivets 6 may be removed.

Before the buckets are applied to the ring 3 the wings or ears 5 thereof are first caused to embrace a forming ring 7 which is of the same shape and size as the ring 3. The buckets have outer abutting walls 8 that are parallel with the wheel. The bucket ears 5 embrace the ring 7 as illustrated clearly in Figs. 4 and 5 whereafter the outer walls 8 of the buckets are welded together where they abut. In this welding process iron wire or pieces of metal 9 are desirably laid in the cracks between the adjacent or abutting ends of the walls 8 whereafter a welding flame is directed against the wire 9 and the portions of the outer walls 8 to weld the said wire and outer walls together wherever each may abut against its neighbor. After the welding operation has been concluded the assembled ring of buckets is removed from the forming ring 7, these buckets now being assembled with the ring 3 in a manner which has been described, it being noted that said ears are radially spaced apart to receive the ring 3 therebetween and that said ears are so formed that they may be slipped into engagement with ring 3 by movement of the group of buckets toward the wheel parallel with the axis of the wheel.

Having thus described my invention I claim as new and desire to secure by Letters Patent the following:—

A rotor for turbines including a wheel for supporting turbine buckets and carrying a ring at one face thereof; a group of buckets having abutting outer walls that are parallel with the wheel and are welded together where they abut, said buckets having radially spaced apart rearwardly extending ears receiving said ring between them and formed to slip over said ring by movement of the group of buckets toward the wheel and parallel with the axis of the wheel; and means for fastening said ears and ring together.

In witness whereof, I hereunto subscribe my name this 9th day of June, A. D. 1916.

MARK A. ROSS.

Witnesses:
G. L. CRAGG,
ETTA L. WHITE.

Copies of this patent may be obtained for five cents each, by addressing the "Commissioner of Patents, Washington, D. C."